(12) United States Patent
Nakagawa et al.

(10) Patent No.: US 9,148,926 B2
(45) Date of Patent: Sep. 29, 2015

(54) LED LAMP

(71) Applicant: Phoenix Electric Co., Ltd., Hyogo (JP)

(72) Inventors: Atsuji Nakagawa, Hyogo (JP); Toshitaka Fujii, Hyogo (JP)

(73) Assignee: PHOENIX ELECTRIC CO., LTD., Hyogo (JP)

( * ) Notice: Subject to any disclaimer, the term of this patent is extended or adjusted under 35 U.S.C. 154(b) by 0 days.

(21) Appl. No.: 14/226,542

(22) Filed: Mar. 26, 2014

(65) Prior Publication Data

US 2014/0368126 A1     Dec. 18, 2014

(30) Foreign Application Priority Data

Jun. 14, 2013   (JP) .................................. 2013-125247

(51) Int. Cl.
*H05B 33/08* (2006.01)

(52) U.S. Cl.
CPC ........ *H05B 33/0845* (2013.01); *H05B 33/0815* (2013.01); *H05B 33/0827* (2013.01)

(58) Field of Classification Search
USPC .................. 315/307, 224, 185 R, 192; 345/82
See application file for complete search history.

(56) References Cited

U.S. PATENT DOCUMENTS

| | | | |
|---|---|---|---|
| 6,734,875 B1 * | 5/2004 | Tokimoto et al. | ............. 345/690 |
| 7,791,289 B2 | 9/2010 | Oosterbaan et al. | |
| 8,120,279 B2 | 2/2012 | Oosterbaan et al. | |
| 2011/0109245 A1 | 5/2011 | Lin et al. | |
| 2011/0221346 A1 | 9/2011 | Lee et al. | |
| 2012/0126710 A1 | 5/2012 | Lin et al. | |
| 2012/0217878 A1 | 8/2012 | Lin et al. | |
| 2013/0063035 A1 | 3/2013 | Baddela et al. | |
| 2013/0069546 A1 | 3/2013 | Lin et al. | |
| 2013/0234619 A1 | 9/2013 | Sempel | |
| 2014/0191674 A1 | 7/2014 | Baddela et al. | |

FOREIGN PATENT DOCUMENTS

| | | |
|---|---|---|
| CN | 102269369 | 12/2011 |
| EP | 2373142 | 10/2011 |
| JP | 2008-507817 A | 3/2008 |
| JP | 2009-009817 | 1/2009 |
| JP | 2009009782 | 1/2009 |
| JP | 2009009817 A * | 1/2009 |
| JP | 2011-96647 | 5/2011 |
| JP | 2013-45768 | 3/2013 |
| WO | 2012069961 | 5/2012 |

OTHER PUBLICATIONS

Japanese Office Action, Japanese Patent Application No.: 2013-125247, Dispatch date: Oct. 28, 2014 and English translation thereof (total of 4 pages).
Office Action dated Mar. 3, 2015 for corresponding Japanese Patent Application No. 2013-125247 with its English translation.
Extended European Search Report dated Jul. 17, 2015 issued for the corresponding European Patent Application No. 14161477.6.

* cited by examiner

*Primary Examiner* — David H Vu
(74) *Attorney, Agent, or Firm* — Lucas & Mercanti, LLP

(57) ABSTRACT

An LED lamp comprises: a first LED part, a second LED part that is connected to the first LED part in parallel and is configured to emit a light with a color temperature lower than that of a light to be emitted from the first LED part, and an impedance circuit that is connected to the first LED part in parallel while being connected to the second LED part in series.

7 Claims, 6 Drawing Sheets

FIG. 2
(a) Vi
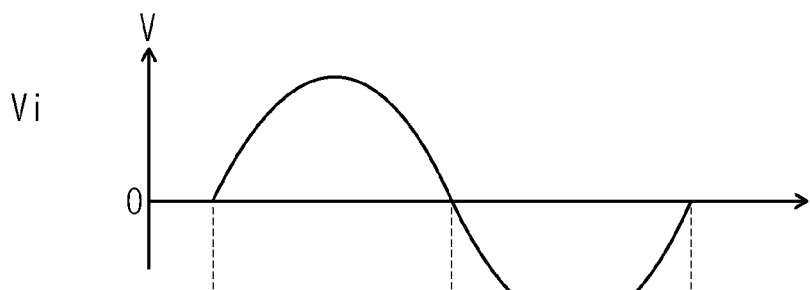
(b) Vdc
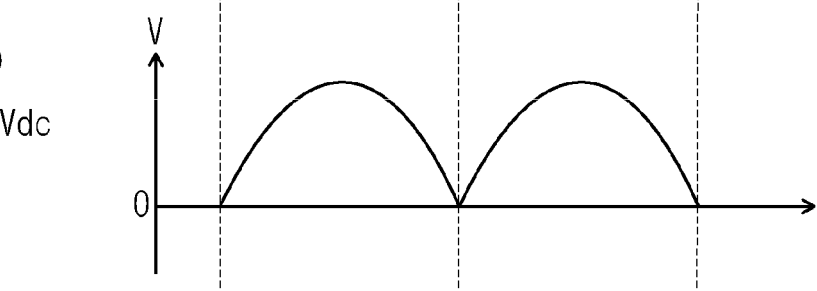
(c) Ic
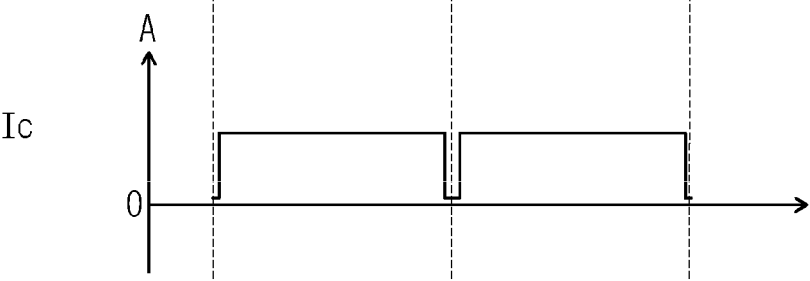
(d) Io

LED LAMP

CROSS REFERENCE TO RELATED APPLICATION

This Application claims the priority of Japanese Patent Application No. 2013-125247 filed on Jun. 14, 2013, which is incorporated by reference herein.

BACKGROUND OF THE INVENTION

1. Field of the Invention

The present invention relates to a LED lamp configured to be lit up by application of an input current varying in response to a dimming operation with use of a phase control dimmer or so forth.

2. Background Art

In comparison with a well-known incandescent lamp (including a halogen lamp), a light emitting diode (hereinafter referred to as "LED") is more advantageous in its lower power consumption and longer lifetime. Therefore, with growing awareness of demanders for ecology, the LED has been rapidly prevailed as a countermeasure for energy saving in a wide range of usage. Moreover, needs to use the LED instead of the incandescent lamp have been also increased. In addition, brightness of a light from the LED has been generally varied by a dimming operation with use of a phase control dimmer or so forth.

Incidentally, the well-known incandescent lamp is configured to gradually dim a light by reducing the conduction angle of a commercial alternating-current voltage through a dimming operation with use of a phase control dimmer. When the incandescent lamp is gradually dimmed, the temperature of a filament configured to emit a light inside the incandescent lamp is lowered. Accordingly, the color temperature of a light to be emitted from the filament is also lowered (gets reddish).

By contrast, the color temperature of a light to be emitted from an LED is not varied even when the LED is dimmed by reducing a current. Therefore, it has been demanded to produce an LED lamp configured to vary its color temperature in response to a dimming operation as with the well-known incandescent lamp, whereby a desired atmosphere can be maintained in a guest room. This is because such LED lamps can be used as alternatives for halogen lamps to be used in hotels and so forth in which chances of dimming are relatively high.

Publication of Japanese translation of PCT international application No. JP-A-2008-507817 can be herein exemplified as a well-known technology of an LED driver circuit whereby a color temperature is varied. The LED driver circuit described in the Publication No. JP-A-2008-507817 includes lamp ballast circuits and a ballast control circuit. The lamp ballast circuits are respectively configured to supply a power to at least two LEDs that the color temperatures thereof are different from each other. The ballast control circuit is configured to output a lamp control signal in accordance with the value of an input supply voltage that varies in response to a dimming operation. Further, the magnitude of a voltage to be supplied from each lamp ballast circuit to its relevant LED lamp is configured to vary in response to the lamp control signal to be supplied from the ballast control circuit.

With reduction in input supply voltage, the LED drive circuit described in the Publication No. JP-A-2008-507817 is configured to reduce the ratio of a voltage to be supplied to an LED with a relatively high color temperature, while being configured to increase the ratio of a voltage to be supplied to an LED with a relatively low color temperature. Accordingly, the color temperature of a light to be emitted from the entire LED lamp can be reduced in accordance with reduction in light intensity just like a light to be emitted from an incandescent lamp.

As described above, in the LED driver circuit described in the Publication No. JP-A-2008-507817, each lamp ballast circuit is configured to supply a power to its relevant LED lamp. In other words, the required number of lamp ballast circuits is the same as the number of the LED lamps relevant to the lamp ballast circuits. This results in increase in circuit size of the LED driver circuit. It has been thus difficult to satisfy the demand for reduction in size of an LED lamp as an alternative of a halogen lamp.

In addition, the LED driver circuit described in the Publication No. JP-A-2008-507817 is of a voltage control type configured to: receive an input supply voltage that varies in response to a dimming operation; rectify the input supply voltage; and control LEDs with different color temperatures in accordance with a square wave of the resultant rectified voltage. Therefore, a drawback has been also produced that a current to be supplied to an LED contains a missing part roughly at a zero voltage and this is likely to be a cause of flicker. To solve such a drawback of flicker, conversion of voltage or current in accordance with a square wave is required for the lamp ballast circuits. Accordingly, another drawback is inevitably produced that the circuit size is increased and the circuit structure is complicated.

The present invention has been developed in view of the aforementioned drawbacks of the well-known art. Therefore, it is a main object of the present invention to provide an LED lamp that is capable of dimming a light and emitting a light with a low color temperature with a simple circuit structure as with an incandescent lamp.

SUMMARY OF THE INVENTION

A first aspect of the present invention relates to a LED lamp that is configured to be lit up by application of a direct-current input current with a magnitude varying in response to a dimming operation, and includes:

a first LED part;

a second LED part that is connected to the first LED part in parallel and is configured to emit a light with a color temperature lower than a color temperature of a light to be emitted from the first LED part; and an impedance circuit that is connected to the first LED part in parallel while being connected to the second LED part in series.

The impedance circuit may be a constant current circuit configured to light up the second LED part with a constant current.

The impedance circuit may be an air cooling fan. Alternatively, the impedance circuit may be formed by connecting an air cooling fan and a constant current circuit in parallel.

A forward voltage of the first LED part can be set to be higher than a forward voltage of the second LED part.

Advantageous Effects of Invention

According to the present invention, it is possible to provide an LED lamp that is capable of dimming a light and emitting a light with a lower color temperature with a simple circuit structure as with an incandescent lamp.

BRIEF DESCRIPTION OF THE DRAWINGS

Referring now to the attached drawings which form a part of this original disclosure:

FIG. 2 is a diagram showing waveforms in respective positions in a condition where the conduction angle in a dimmer is 180 degrees;

DETAILED DESCRIPTION OF THE EMBODIMENTS

Figure 1:
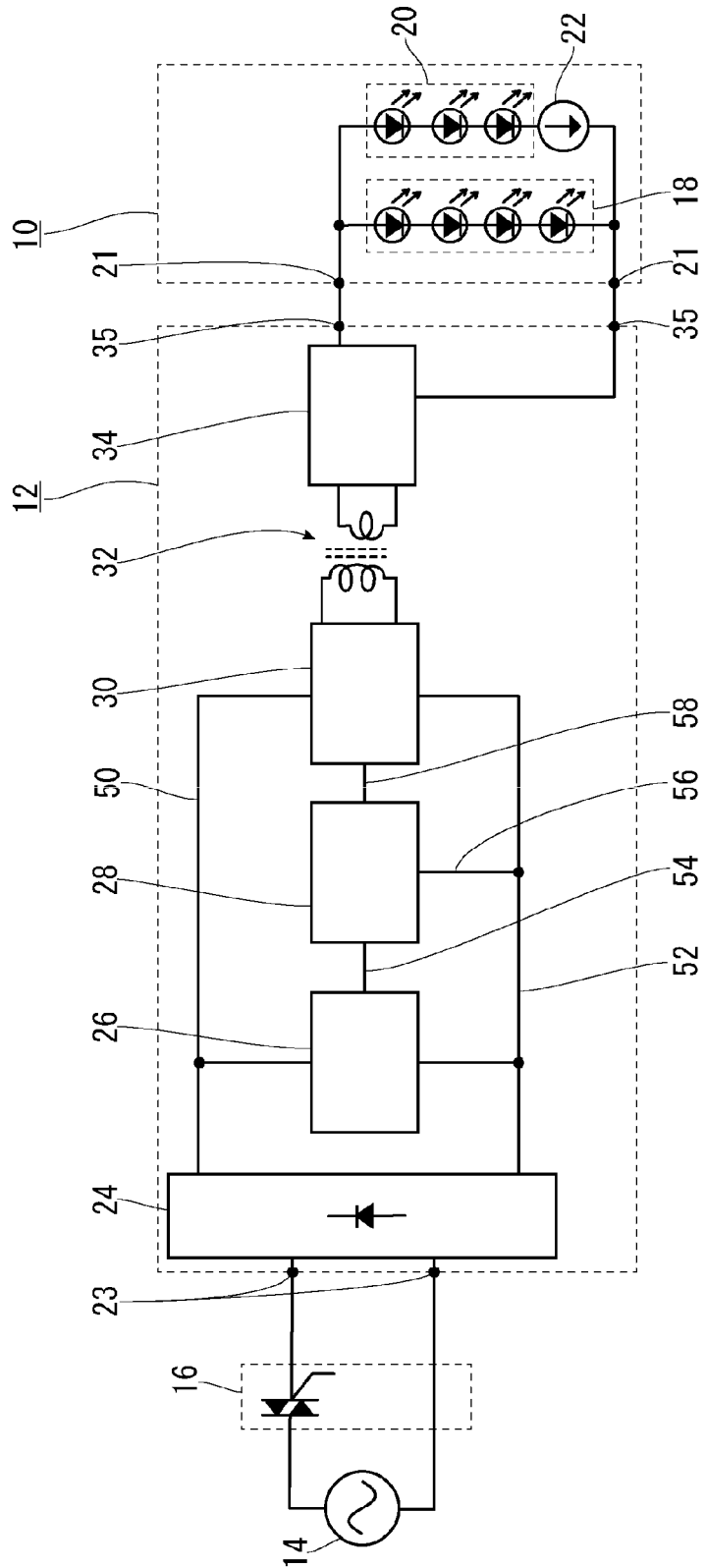
FIG. 1 is a circuit diagram showing an exemplary circuit configuration of an LED lamp and an LED driver circuit to which the present invention is applied.

With reference to the drawings, explanation will be made for a practical example to which the present invention is applied. FIG. 1 shows an LED lamp 10 and an LED drive circuit 12 according to the practical example to which the present invention is applied. A phase control dimmer 16 is configured to control the conduction angle of an alternating-current (hereinafter referred to as "AC") power from a commercial AC power source 14, and then, the controlled AC power is configured to be inputted into the LED driver circuit 12 according to the practical example of FIG. 1.

The LED lamp 10 includes a first LED part 18, a second LED part 20, an impedance circuit 22 and a pair of LED lamp input terminals 21.

The first LED part 18 is composed of at least one LED, and is configured to emit a light with a predetermined color temperature. In the present practical example, the first LED part 18 is composed by connecting a plurality of LEDs in series. However, the first LED part 18 may be composed by connecting the respective LEDs in parallel. Further, the both ends of the first LED part 18 are electrically connected to the pair of LED lamp input terminals 21, respectively. It should be noted that, where the first LED part 18 is composed of a plurality of LEDs, the respective LEDs may be configured to emit lights with the same color temperature, or alternatively, may be configured to emit lights with color temperatures different from each other (note this is also true to the second LED part 20). Further, the color temperature of a light to be emitted from the entire first LED part 18 is set to be higher than that of a light to be emitted from the entire second LED part 20.

Similarly to the first LED part 18, the second LED part 20 is also composed of at least one LED. The second LED part 20 is, from the perspective of its entirety, configured to emit a light with a color temperature lower than that of a light to be emitted from the entire first LED part 18. Further, the second LED part 20 is connected to the first LED part 18 in parallel.

It should be noted that the forward voltage of the first LED part 18 is set to be higher than that of the second LED part 20 in order to operate the impedance circuit 22. Suppose the forward voltage of the first LED part 18 cannot be set to be higher than that of the second LED part 20, it is required to increase the apparent forward voltage of the first LED part 18 by, for instance, connecting a constant voltage element (e.g., a zener diode) to the first LED part 18 in series.

The impedance circuit 22 is a circuit that is connected to the first LED part 18 in parallel, while being connected to the second LED part 20 in series. A role of the impedance circuit 22 is to reduce a proportionality constant (gradient) of increase or reduction in a current $I_o2$ flowing through the second LED part 20 than that of increase or reduction in a current $I_o1$ flowing through the first LED part 18 when a current $I_o$ flowing through the entirety of the first and second LED parts 18 and 20 is increased or reduced.

In the present practical example, the constant current circuit is used as the impedance circuit 22. However, the impedance circuit 22 is not limited to "the constant current circuit". Alternatively, as described below, an air cooling fan for cooling the LED lamp 10 (LED elements, impedance circuit, chassis) may be used as the impedance circuit 22. Yet alternatively, a resistor used in general can be used as the impedance circuit 22.

The LED driver circuit 12 is a circuit configured to supply the direct-current (hereinafter referred to as "DC") input current $I_o$ to the aforementioned LED lamp 10. It should be noted that the magnitude of the DC input current $I_o$ varies in response to a dimming operation. The LED driver circuit 12, as an example, includes a pair of LED driver circuit input terminals 23, a rectifier circuit 24, an input waveform decoder 26, an output current control circuit 28, a constant current driver circuit 30, an insulating transformer 32, an output rectifier circuit 34 and a pair of LED driver circuit output terminals 35. It should be noted that an LED driver circuit such as the LED driver circuit 12 has been recently commercialized as an external power source (e.g., an insulating LED driver module compatible with phase control dimming (Model: TLD-06A35A) manufactured by TOYOSTAR Corporation).

The rectifier circuit 24 is a circuit configured to rectify an alternating current that is introduced into the LED driver circuit 12 through the LED driver circuit input terminals 23 after the conduction angle thereof is controlled by the phase control dimmer 16. Normally, a full-wave rectifier circuit is used as the rectifier circuit 24. Further, two lead wires (i.e., a plus line 50 and a zero volt line 52) are extended from the rectifier circuit 24.

The input waveform decoder 26 is connected between the plus line 50 and the zero volt line 52. The input waveform decoder 26 is a circuit configured to output a signal (decoder output current) $I_C$ with a duty cycle in accordance with the conduction angle of the alternating current introduced into the LED driver circuit 12. A decoder output current line 54 is extended from the input waveform decoder 26 in order to output the decoder output current $I_C$ to the output current control circuit 28.

The output current control circuit 28 is a circuit configured to output a control signal to the constant current drive circuit 30 in accordance with the duty cycle signal (decoder output current) $I_C$ outputted from the input waveform decoder 26. The decoder output current line 54, extended from the input waveform decoder 26, is connected to the output current control circuit 28. Further, an earth line 56 and a control signal line 58 are respectively extended from the output current control circuit 28. The earth line 56 is connected to the zero volt line 52, whereas the control signal line 58 is a line for outputting the control signal to the constant current driver circuit 30.

The constant current driver circuit 30 is a circuit configured to output a constant current with a magnitude in accordance with the control signal outputted from the output current control circuit 28. In other words, the magnitude of the constant current to be outputted from the constant current driver circuit 30 is set in accordance with the conduction angle determined by the phase control dimmer 16. The constant current driver circuit 30 is connected between the plus line 50 and the zero volt line 52. Further, the control signal line 58, extended from the output current control circuit 28, is connected to the constant current driver circuit 30.

The constant current, outputted from the constant current driver circuit 30, is applied to the output rectifier circuit 34 through the insulating transformer 32. The direct current $I_o$ with a magnitude in accordance with the conduction angle is outputted to the LED driver circuit output terminals 35 from the output rectifier circuit 34. The LED driver circuit output terminals 35 are herein electrically connected to the LED lamp input terminals 21 of the LED lamp 10, respectively. Thus, the direct current $I_o$ is introduced into the LED lamp 10 through the LED lamp input terminals 21.

The phase control dimmer 16 is configured to control the conduction angle of an AC power from the commercial AC power source 14. In the present practical example, a heretofore known phase control dimmer, so-called a TRIAC dimmer, is used as the phase control dimmer 16. The output from the phase control dimmer 16 is inputted, as an input voltage $V_i$ varying in accordance with the conduction angle, into the LED driver circuit 12 through the LED drive input terminals 23 of the LED drive circuit 12.

Next, explanation will be made for the action of the LED driver circuit 12 and that of the LED lamp 10 when the LED lamp 10 is lit up with use of the LED driver circuit 12 in the present practical example. Specifically, explanation will be made firstly for the action of the LED driver circuit 12 and then for the action of the LED lamp 10.

Firstly, with reference to FIG. 2, explanation will be made for a condition that the conduction angle of the output from the phase control dimmer 16 is 180 degrees. FIG. 2(a) shows the output from the phase control dimmer 16, i.e., the input voltage $V_i$ to be introduced into the LED driver circuit 12. The input voltage $V_i$ is full-wave rectified in the rectifier circuit 24, and is changed into a rectifier circuit output voltage $V_{dc}$ shown in FIG. 2(b). Then, the input waveform decoder 26 receives the rectifier circuit output voltage $V_{dc}$ and outputs the decoder output current $I_C$ shown in FIG. 2(c). Then, the output current control circuit 28 receives the decoder output current $I_C$, and outputs a constant current with a magnitude in accordance with the duty cycle of the decoder output current $I_C$ (not shown in the drawings). The constant current flows through the insulating transformer 32, and is then outputted from the output rectifier circuit 34 as the driver circuit output current $I_o$ shown in FIG. 2(d). The driver circuit output current $I_o$ is maximized (i.e., the maximum output current $I_o$ (max)), where the conduction angle in the phase control dimmer 16 is 180 degrees.

Figure 3:
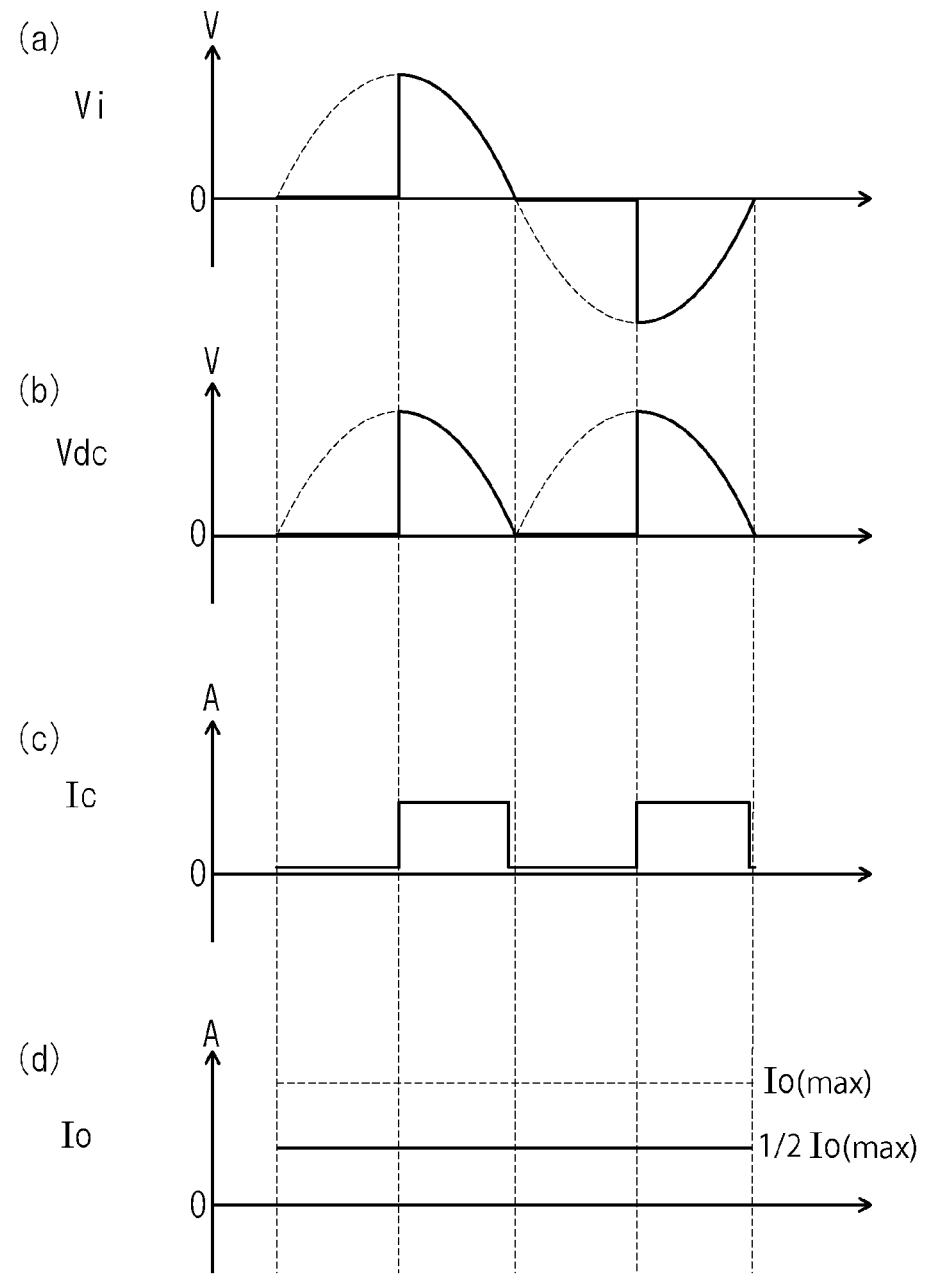
FIG. 3 is a diagram showing waveforms in respective positions in a condition where the conduction angle in the dimmer is 90 degrees.

Next, with reference to FIG. 3, explanation will be made for a condition that the conduction angle of the output from the phase control dimmer 16 is 90 degrees. FIG. 3(a) shows the input voltage $V_i$ from the phase control dimmer 16. In comparison with FIG. 2(a), the input voltage $V_i$ is formed as if the first 90-degree amount of each half wave (i.e., the former halves of the entire half waves) were cut off. The input voltage $V_i$ is full-wave rectified in the rectifier circuit 24, and is changed into the rectifier circuit output voltage $V_{dc}$ shown in FIG. 3(b). Then, the input waveform decoder 26 receives the rectifier circuit output voltage $V_{dc}$, and outputs the decoder output current $I_C$ shown in FIG. 3(c). The decoder output current $I_C$ is herein formed as if the former halves of the half waves were cut off in accordance with the rectifier circuit output voltage $V_{dc}$. Then, the output current control circuit 28 receives the decoder output current $I_C$, and outputs a constant current with a magnitude in accordance with the duty cycle of the decoder output current $I_C$ (not shown in the drawings). The constant current flows through the insulating transformer 32, and is then outputted from the output rectifier circuit 34 as the driver circuit output current $I_o$ shown in FIG. 3(d). In the condition that the conduction angle in the phase control dimmer 16 is 90 degrees, the driver circuit output current $I_o$ is reduced to roughly half the output current $I_o$ (max) in the condition that the conduction angle is 180 degrees.

The outputted driver circuit output current $I_o$ is introduced into the LED lamp 10 through the LED lamp input terminals 21. As described above, within the LED lamp 10, the first LED part 18 and the second LED part 20 are connected in parallel, whereas the impedance circuit 22 is connected to the first LED part 18 in parallel while being connected to the second LED part 20 in series. Therefore, the driver circuit output current $I_o$ is configured to flow so as to be branched into two paths, i.e., a path composed of the first LED part 18 and a path composed of the second LED part 20 and the impedance circuit 22. In the specification of the present application, the reference sign $I_o1$ is assigned to the current flowing through the path composed of the first LED part 18, whereas the reference sign $I_o2$ is assigned to the current flowing through the path composed of the second LED part 20 and the impedance circuit 22.

Figure 4:
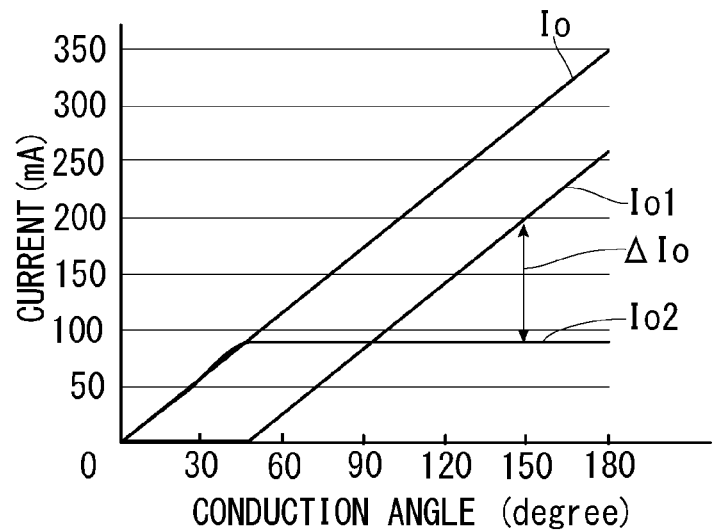
FIG. 4 is a chart showing magnitudes of respective currents in a condition where the conduction angle is varied with use of the circuit shown in FIG. 1.

With reference to FIG. 4 and Table 1, explanation will be made for a practical example where the driver circuit output current $I_o$ (max) (i.e., the current $I_o$ (max) inputted into the LED lamp 10) is 350 mA. Values in FIG. 4 and Table 1 are values of a standard constant current to be outputted from an external power source (i.e., the LED driver circuit 12) commercialized as a product. Further, in the practical example shown in FIG. 4 and Table 1, the current of the impedance circuit 22 (i.e., a constant current circuit) is set to be 90 mA. In other words, the current $I_o2$ is set to be 90 mA. The current $I_o2$ is maintained at 90 mA by the impedance circuit 22, where the input current $I_o$ (set to be roughly 90 to 350 mA in the present practical example), corresponding to a conduction angle range of roughly 60 to 180 degrees set by the phase control dimmer 16, is applied to the LED lamp 10 from the LED driver circuit 12.

TABLE 1

| CONDUCTION ANGLE (deg) | Io (mA) | Io1 (mA) | Io2 (mA) |
|---|---|---|---|
| 0 | 0 | 0 | 0 |
| 15 | 29 | 0 | 29 |
| 30 | 58 | 0 | 58 |
| 45 | 88 | 0 | 88 |
| 60 | 117 | 27 | 90 |
| 75 | 146 | 56 | 90 |
| 90 | 175 | 85 | 90 |
| 105 | 204 | 114 | 90 |
| 120 | 233 | 143 | 90 |
| 135 | 263 | 173 | 90 |
| 150 | 292 | 202 | 90 |
| 165 | 321 | 231 | 90 |
| 180 | 350 | 260 | 90 |
| LED VOLTAGE (V) | | 12 | 9 |
| LED POWER (W) | | 3.1 | 0.8 |

On the other hand, the current $I_o1$ flowing through the first LED part 18 is given by an expression "$I_o - I_o2$". In short, where the conduction angle is 180 degrees (i.e., $I_o$ (max)), the current $I_o1$ is obtained as: $I_o1 = 350\text{ mA} - 90\text{ mA} = 260\text{ mA}$. The value of the current $I_o1$ is gradually reduced in proportion to reduction in conduction angle. Where the conduction angle is roughly 45 degrees, the value of the current $I_o1$ will be 0 mA. On the other hand, where the conduction angle is less than or equal to 60 degrees, the value of the current $I_o2$ is also gradually reduced.

When the LED lamp 10 is operated as described above, the current $I_o1$ becomes greater than the current $I_o2$ where the conduction angle is wide (e.g., 105 to 180 degrees). Thus, a relatively high color temperature light from the first LED part 18 is emphasized. Consequently, the high color temperature light stands out in the entire LED lamp 10.

By contrast, the current $I_o1$ becomes less than the current $I_o2$, where the conduction angle is narrow (e.g., 90 degrees or less). Thus, a relatively low color temperature light from the second LED part 20 is emphasized. Consequently, the low color temperature light stands out in the entire LED lamp 10.

When the conduction angle is gradually reduced, a difference between the current $I_o1$ and the current $I_o2$ (i.e., $\Delta I_o$) is gradually reduced. Hence, the color temperature of a light to be outputted from the LED lamp 10 is also reduced in accordance with reduction in light emission amount. Thus, the relation between the light emission amount and the color temperature is the same as that in a well-known incandescent lamp. Therefore, the LED lamp 10 of the present practical example is preferred as an alternative of the well-known incandescent lamp. It should be noted that Table 2 shows an example with LED voltage settings of: the voltage ($V_f1$) of the first LED part 18=12V (four LED elements); and the voltage ($V_f2$) of the second LED part 20=9V (three LED elements). As shown in Table 2, where the conduction angle is 180 degrees, the current $I_o1$ is 260 mA whereas the current $I_o2$ is 90 mA. Therefore, the LED power of the first LED part 18 is obtained as: $W_o1=V_f1 \times I_o1 \approx 3.1$ W, whereas the LED power of the second LED part 20 is obtained as: $W_o2=V_f2 \times I_o2 \approx 0.8$ W.

Figure 5:
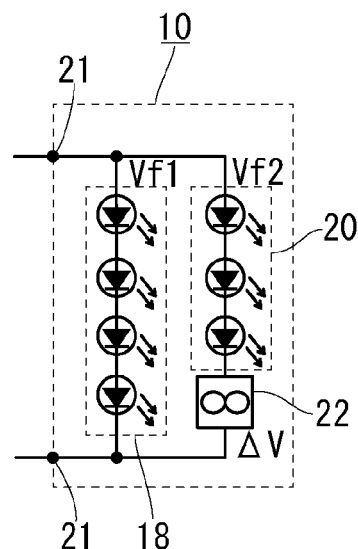
FIG. 5 is a circuit diagram showing an LED lamp according to another practical example.
Figure 6:
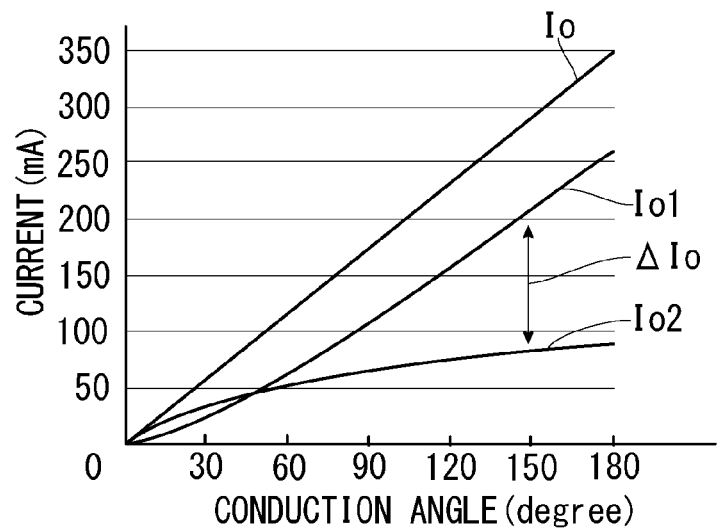
FIG. 6 is a chart showing magnitudes of respective currents in a condition where the conduction angle is varied with use of the circuit shown in FIG. 5.

FIG. 5 shows another practical example of the impedance circuit 22 where an air cooling fan for cooling the LED lamp 10 (LED elements, impedance circuit, chassis) is used. The potential difference (i.e., $\Delta V$) between the voltage $V_f1$ of the first LED part 18 and the voltage $V_f2$ of the second LED part 20 is applied to the impedance circuit 22 (i.e., the air cooling fan) of the present practical example, while the current $I_o2$ flows through the second LED part 20 and the impedance circuit 22 in accordance with the potential difference $\Delta V$. When the input current $I_o$ is reduced in accordance with the conduction angle, the voltage of the first LED part 18 and that of the second LED part 20 are likely to be slightly reduced. Thus, when the input current $I_o$ is reduced, the potential difference $\Delta V$ is also reduced to some extent. As a result, when the input $I_o$ is reduced, the current $I_o2$ is also gradually reduced as shown in FIG. 6 and Table 2. Obviously, the present practical example is similar to the aforementioned practical example (see FIG. 4) in that the proportionality constant (gradient) of the current $I_o2$ is sufficiently smaller than that of the input current $I_o$ and the difference between the current $I_o1$ and the current $I_o2$ (i.e., $\Delta I_o$) is gradually reduced when the conduction angle is gradually reduced.

TABLE 2

| CONDUCTION ANGLE (deg) | Io (mA) | Io1 (mA) | Io2 (mA) |
|---|---|---|---|
| 0 | 0 | 0 | 0 |
| 15 | 29 | 9 | 20 |
| 30 | 58 | 23 | 35 |
| 45 | 88 | 43 | 45 |

TABLE 2-continued

| CONDUCTION ANGLE (deg) | Io (mA) | Io1 (mA) | Io2 (mA) |
|---|---|---|---|
| 60 | 117 | 67 | 50 |
| 75 | 146 | 91 | 55 |
| 90 | 175 | 115 | 60 |
| 105 | 204 | 139 | 65 |
| 120 | 233 | 163 | 70 |
| 135 | 263 | 188 | 75 |
| 150 | 292 | 212 | 80 |
| 165 | 321 | 236 | 85 |
| 180 | 350 | 260 | 90 |
| LED VOLTAGE (V) | | 12 | 9 |
| LED POWER (W) | | 3.1 | 0.8 |

When the current $I_o2$ flowing through the impedance circuit 22 (i.e., the air cooling fan) is reduced by gradually reducing the conduction angle, the LED cooling performance of the cooling fan is accordingly degraded. However, the input current $I_o$ is herein reduced, and the amount of heat generated by the LED is also reduced. Therefore, a cooling-related problem is unlikely to be caused. Rather than such a problem, the LED lamp 10 according to the present practical example is advantageous in the following respect. When the conduction angle is gradually reduced, the light emission amount from the LED lamp 10 is reduced while the color temperature is reduced (gets more reddish). Further, the rotation speed of the air cooling fan is reduced and becomes quiet. Thus, the LED lamp 10 is preferred as a lamp to be used in, for instance, a bed room.

Figure 7:
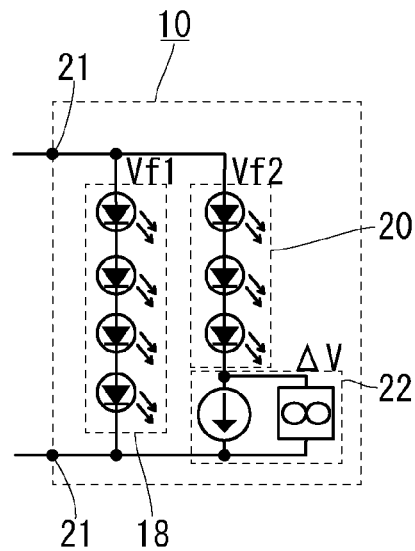
FIG. 7 is a circuit diagram showing an LED lamp according to yet another practical example.

FIG. 7 shows another practical example of the impedance circuit 22. The impedance circuit 22 of the present practical example is composed by connecting a constant current circuit and an air cooling fan in parallel. When the impedance circuit 22 is composed of only the air cooling fan (in the practical example of FIG. 5), the current $I_o2$ flowing through the second LED part 20 greatly depends on the impedance property of the air cooling fan. By contrast, as shown in the present practical example, the configuration of adding the constant current circuit to the air cooling fan in parallel is preferred in that the magnitude of the current $I_o2$ can be set to be a desired value. It should be noted that the operational feature of the present practical example is similar to that shown in FIG. 6, and therefore, the detailed explanation thereof will not be hereinafter made.

Figure 8:
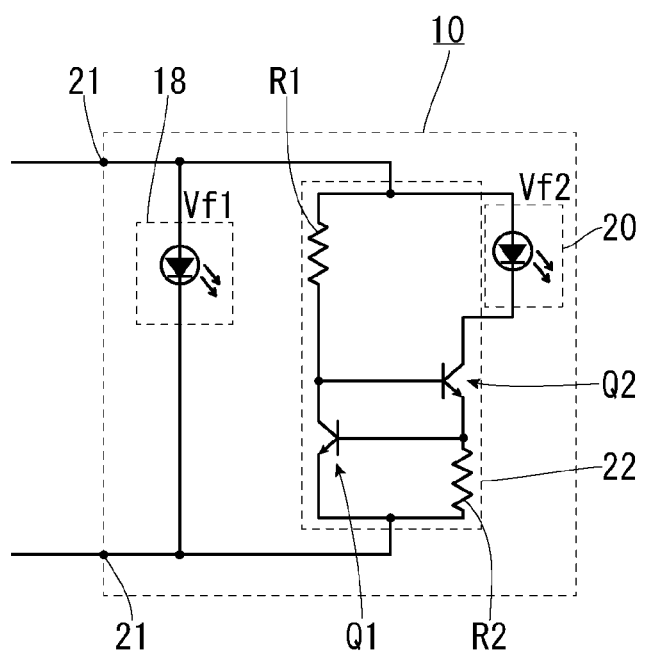
FIG. 8 is a circuit diagram showing a typical example of a constant current circuit.

FIG. 8 shows a typical example of a constant current circuit to be used as the impedance circuit 22 in the respective practical examples. The constant current circuit (i.e., the impedance circuit 22) of the present practical example is composed of two resistors R1 and R2 and two transistors Q1 and Q2. One end of the resistor R1 is connected to an anode of the second LED part 20, whereas the other end of the resistor R1 is connected to a collector of the transistor Q1. A collector of the transistor Q2 is connected to a cathode of the second LED part 20, whereas an emitter of the transistor Q2 is connected to one end of the resistor R2. The other end of the resistor R2 is connected to an emitter of the transistor Q1. A base of the transistor Q1 is connected between the transistor Q2 and the resistor R2, whereas a base of the transistor Q2 is connected between the resistor R1 and the transistor Q1. Further, the potential difference between the second LED part 20 and the resistor R1 and that between the resistor R2 and the transistor Q1 are herein set to be equal to that between the both ends of the first LED part 18.

The value of the current $I_o2$ is determined by a base voltage $V_{BE}$ of the transistor Q1 and a resistance value of the resistor R2, and is given by an expression "$I_o2 \approx V_{BE}/R2$". A considerable amount of potential difference is required for operating the constant current circuit. Therefore, the forward voltage $V_f1$ of the first LED part 18 is preferably set to be higher than the forward voltage $V_f2$ of the second LED part 20. When the relation "$V_f1 > V_f2$" cannot be set, it is possible to cope with the condition by, for instance, adding a zener diode to the first LED part 18 in series so as to increase the apparent voltage $V_f1$ (not shown in the drawings). It should be noted that, when a zener diode is used, the light emission efficiency of the entire LED lamp 10 is reduced due to energy loss attributed to the zener diode.

The specification of the present application has described exemplary regulation of the current $I_o$ inputted into the LED lamp 10 by the phase control dimmer 16 and the LED driver circuit 12 compatible therewith. However, the LED driver circuit 12 of any other type (e.g., a PWM control type) can be used as long as it is capable of outputting the DC input current $I_o$ with a variable magnitude.

It should be understood that the practical examples herein disclosed are illustrative only and are not restrictive in all aspects. It is intended that the scope of the present invention is indicated by the appended claims rather than the aforementioned explanation, and encompasses all the changes that come within the meaning and the range of equivalents of the appended claims.

The disclosure of Japanese Patent Application No. 2013-125247 filed Jun. 14, 2013 including specification, drawings and claims is incorporated herein by reference in its entirety.

REFERENCE SIGNS LIST

10 . . . LED lamp, 12 . . . LED driver circuit, 14 . . . Commercial AC power source, 16 . . . Phase control dimmer, 18 . . . First LED part, 20 . . . Second LED part, 21 . . . LED lamp input terminal, 22 . . . Impedance circuit, 23 . . . LED driver circuit input terminal, 24 . . . Rectifier circuit, 26 . . . Input waveform decoder, 28 . . . Output current control circuit, 30 . . . Constant current driver circuit, 32 . . . Insulating transformer, 34 . . . Output rectifier circuit, 35 . . . LED driver circuit output terminal, 50 . . . Plus line, 52 . . . Zero volt line, 54 . . . Decoder output current line, 56 . . . Earth line, 58 . . . Control signal line

What is claimed is:

1. An LED lamp being configured to be lit up by application of a direct-current input current with a magnitude varying in response to a dimming operation, comprising:
  a first LED part;
  a second LED part being connected to the first LED part in parallel, the second LED part being configured to emit a light with a color temperature lower than a color temperature of a light to be emitted from the first LED part; and
  an impedance circuit being connected to the first LED part in parallel while being connected to the second LED part in series;
  wherein a first forward voltage of the first LED part is higher than a second forward voltage of the second LED part.

2. The LED lamp according to claim 1, wherein the impedance circuit is a constant current circuit configured to light up the second LED part with a constant current.

3. The LED lamp according to claim 1, wherein the impedance circuit is an air cooling fan.

4. The LED lamp according to claim 1, wherein the impedance circuit is formed by connecting an air cooling fan and a constant current circuit in parallel.

5. The LED lamp according to claim 1, wherein the impedance circuit is a resistor.

6. The LED lamp according to claim 2, wherein the constant current circuit is configured to reduce a first proportionality constant of increase or reduction in a first current flowing through the second LED part to be less than a second proportionality constant of increase or reduction in a second current flowing through the first LED part when a third current flowing through the first and second LED parts is increased or reduced.

7. The LED lamp according to claim 3, wherein the air cooling fan is configured to increase or reduce a first current flowing through the air cooling fan when a second current flowing through the first and second LED parts is increased or reduced.

* * * * *